(12) United States Patent
Headddock et al.

(10) Patent No.: US 8,945,497 B2
(45) Date of Patent: Feb. 3, 2015

(54) CATALYST AND PROCESS

(75) Inventors: Gareth Headdock, Thirsk (GB);
Kenneth George Griffin, Royston (GB);
Peter Johnston, Royston (GB); Martin John Hayes, St. Neots (GB)

(73) Assignee: Johnson Matthey PLC, London (GB)

( * ) Notice: Subject to any disclaimer, the term of this patent is extended or adjusted under 35 U.S.C. 154(b) by 713 days.

(21) Appl. No.: 13/119,605

(22) PCT Filed: Sep. 17, 2009

(86) PCT No.: PCT/GB2009/051208
§ 371 (c)(1),
(2), (4) Date: Jun. 6, 2011

(87) PCT Pub. No.: WO2010/032051
PCT Pub. Date: Mar. 25, 2010

(65) Prior Publication Data
US 2011/0229396 A1    Sep. 22, 2011

(30) Foreign Application Priority Data

Sep. 18, 2008  (GB) .................................. 0817109.2

(51) Int. Cl.
*B01D 53/02* (2006.01)
*B01D 53/56* (2006.01)
(Continued)

(52) U.S. Cl.
CPC ............ *B01J 23/6562* (2013.01); *B01J 23/462* (2013.01); *B01J 23/63* (2013.01);
(Continued)

(58) Field of Classification Search
CPC ............ B01J 23/40; B01J 23/42; B01J 23/44;
B01J 23/462; B01J 23/56; B01J 23/63;
B01J 23/6562; B01J 23/75; B01J 23/83;
B01J 23/89; B01J 23/8913; B01J 23/894;
B01J 23/8986; B01J 21/04; B01J 21/06;
B01J 21/08; B01J 21/12
USPC ................. 502/258–263, 304, 324, 326, 327,
502/332–334, 339, 349–351, 355, 415,
502/439; 423/245.1
See application file for complete search history.

(56) References Cited

U.S. PATENT DOCUMENTS 3,509,044 A * 4/1970 Adams et al. ............. 208/216 R
3,833,499 A * 9/1974 Egan et al. ................ 208/111.35
(Continued)

FOREIGN PATENT DOCUMENTS

EA          002486       6/2002
EP         0222714       5/1987
(Continued)

OTHER PUBLICATIONS

International Search Report dated Jan. 13, 2010, application No. PCT/GB2009/051208.
(Continued)

*Primary Examiner* — Cam N. Nguyen
(74) *Attorney, Agent, or Firm* — RatnerPrestia

(57) ABSTRACT

The invention concerns a process for the oxidation of organic compounds contained in a gas stream and comprises the step of introducing the gas stream containing the organic compounds together with sufficient oxygen to effect the desired amount of oxidation into an oxidation reactor containing an oxidation catalyst and maintaining the temperature of said gas stream at a temperature sufficient to effect oxidation, characterised in that the oxidation catalyst contains at least 0.01% by weight of ruthenium, cobalt or manganese.

15 Claims, 2 Drawing Sheets

(51) Int. Cl.

| | | |
|---|---|---|
| *B01J 8/00* | (2006.01) | |
| *C07C 11/24* | (2006.01) | |
| *B01J 21/00* | (2006.01) | |
| *B01J 21/04* | (2006.01) | |
| *B01J 23/00* | (2006.01) | |
| *B01J 23/02* | (2006.01) | |
| *B01J 23/10* | (2006.01) | |
| *B01J 23/42* | (2006.01) | |
| *B01J 23/44* | (2006.01) | |
| *B01J 23/56* | (2006.01) | |
| *B01J 23/58* | (2006.01) | |
| *B01J 20/00* | (2006.01) | |
| *B01J 23/656* | (2006.01) | |
| *B01J 23/46* | (2006.01) | |
| *B01J 23/63* | (2006.01) | |
| *B01J 23/89* | (2006.01) | |
| *B01J 23/40* | (2006.01) | |

(52) U.S. Cl.
CPC ...... *B01J 23/8913* (2013.01); *B01D 2251/102* (2013.01); *B01D 2255/1026* (2013.01); *B01D 2255/2073* (2013.01); *B01D 2255/20746* (2013.01); *B01D 2257/702* (2013.01); *B01D 2257/708* (2013.01); *B01J 21/04* (2013.01); *B01J 23/40* (2013.01)
USPC ........ 423/245.1; 502/258; 502/259; 502/260; 502/304; 502/326; 502/327; 502/332; 502/333; 502/334; 502/339; 502/349; 502/350; 502/351; 502/355; 502/415; 502/439

(56) References Cited

U.S. PATENT DOCUMENTS

| | | | | |
|---|---|---|---|---|
| 3,972,833 | A * | 8/1976 | Michalko et al. ................ 502/8 |
| 4,059,675 | A | 11/1977 | Yang | |
| 4,059,676 | A | 11/1977 | Yang | |
| 4,070,270 | A * | 1/1978 | Rausch ........................ 208/111.1 |
| 4,070,272 | A * | 1/1978 | Rausch ........................ 208/217 |
| 4,243,516 | A * | 1/1981 | Martino et al. .............. 208/139 |
| 4,459,372 | A * | 7/1984 | Arena ........................... 502/351 |
| 4,513,090 | A * | 4/1985 | Eberly et al. ................ 502/66 |
| 4,537,873 | A * | 8/1985 | Kato et al. ................... 502/242 |
| 4,639,432 | A | 1/1987 | Holt | |
| 4,868,148 | A * | 9/1989 | Henk et al. ................... 502/303 |
| 4,923,842 | A * | 5/1990 | Summers ..................... 502/261 |
| 5,023,226 | A | 6/1991 | Immel | |
| 5,128,306 | A * | 7/1992 | Dettling et al. .............. 502/304 |
| 5,208,200 | A * | 5/1993 | Soled et al. .................. 502/241 |
| 5,254,518 | A * | 10/1993 | Soled et al. .................. 502/241 |
| 5,653,949 | A | 8/1997 | Chen | |
| 5,851,948 | A * | 12/1998 | Chuang et al. ................ 502/314 |
| 6,296,759 | B1 * | 10/2001 | Vaarkamp et al. ............ 208/217 |
| 6,395,675 | B1 * | 5/2002 | Suga et al. ..................... 502/326 |
| 6,417,135 | B1 * | 7/2002 | Dyroff ........................... 502/325 |
| 6,429,167 | B1 | 8/2002 | Maeno et al. | |
| 6,573,214 | B2 * | 6/2003 | Abdo et al. ................... 502/332 |
| 6,610,628 | B2 * | 8/2003 | Nordquist et al. ........... 502/159 |
| 6,797,669 | B2 * | 9/2004 | Zhang et al. .................. 502/339 |
| 7,030,055 | B2 * | 4/2006 | Yaluris et al. ................. 502/326 |
| 7,041,866 | B1 * | 5/2006 | Gillespie ....................... 585/750 |
| 7,056,857 | B2 * | 6/2006 | Srinivasan et al. ........... 502/327 |
| 7,094,730 | B2 * | 8/2006 | LaBarge et al. .............. 502/332 |
| 7,371,358 | B2 * | 5/2008 | Upchurch et al. ........ 423/213.5 |
| 7,410,931 | B2 * | 8/2008 | Scholten et al. .............. 502/406 |
| 7,541,310 | B2 * | 6/2009 | Espinoza et al. .............. 502/326 |
| 7,605,108 | B2 * | 10/2009 | Wakamatsu et al. .......... 502/326 |
| 7,670,985 | B2 * | 3/2010 | Ding et al. .................... 502/180 |
| 8,227,644 | B2 * | 7/2012 | Johnston et al. .............. 568/484 |
| 8,501,652 | B2 * | 8/2013 | Johnston et al. .............. 502/100 |
| 8,778,831 | B2 * | 7/2014 | Southward et al. ........... 502/304 |
| 2003/0078158 | A1 | 4/2003 | Rei | |
| 2003/0105171 | A1 * | 6/2003 | Subramanian et al. ....... 518/715 |
| 2003/0161775 | A1 | 8/2003 | Rodemerck | |
| 2005/0239643 | A1 | 10/2005 | Benderly et al. | |
| 2010/0197686 | A1 * | 8/2010 | Xing et al. ................ 514/233.5 |
| 2010/0197959 | A1 * | 8/2010 | Johnston et al. .............. 560/265 |

FOREIGN PATENT DOCUMENTS

| | | |
|---|---|---|
| EP | 0699471 | 3/1996 |
| EP | 0660746 | 3/1997 |
| EP | 1100611 | 5/2001 |
| EP | 1315769 | 1/2005 |
| GB | 2120572 | 12/1983 |
| JP | 2001321786 | 11/2001 |
| JP | 2006160726 | 6/2006 |
| RU | 2311957 C1 | 12/2007 |
| TW | 1274604 | 3/2007 |
| WO | 0207878 | 1/2002 |
| WO | 03101612 | 12/2003 |

OTHER PUBLICATIONS

GB Search Report dated Apr. 18, 2007, application No. GB0618029.3, which is not the priority application but is the same subject matter as the present application.
International Preliminary Report on Patentability dated Mar. 22, 2011, from PCT International Application No. PCT/GB2009/051208.
English translation of an Office Action of the Intellectual Property Office of Taiwan dated Mar. 14, 2014.

* cited by examiner

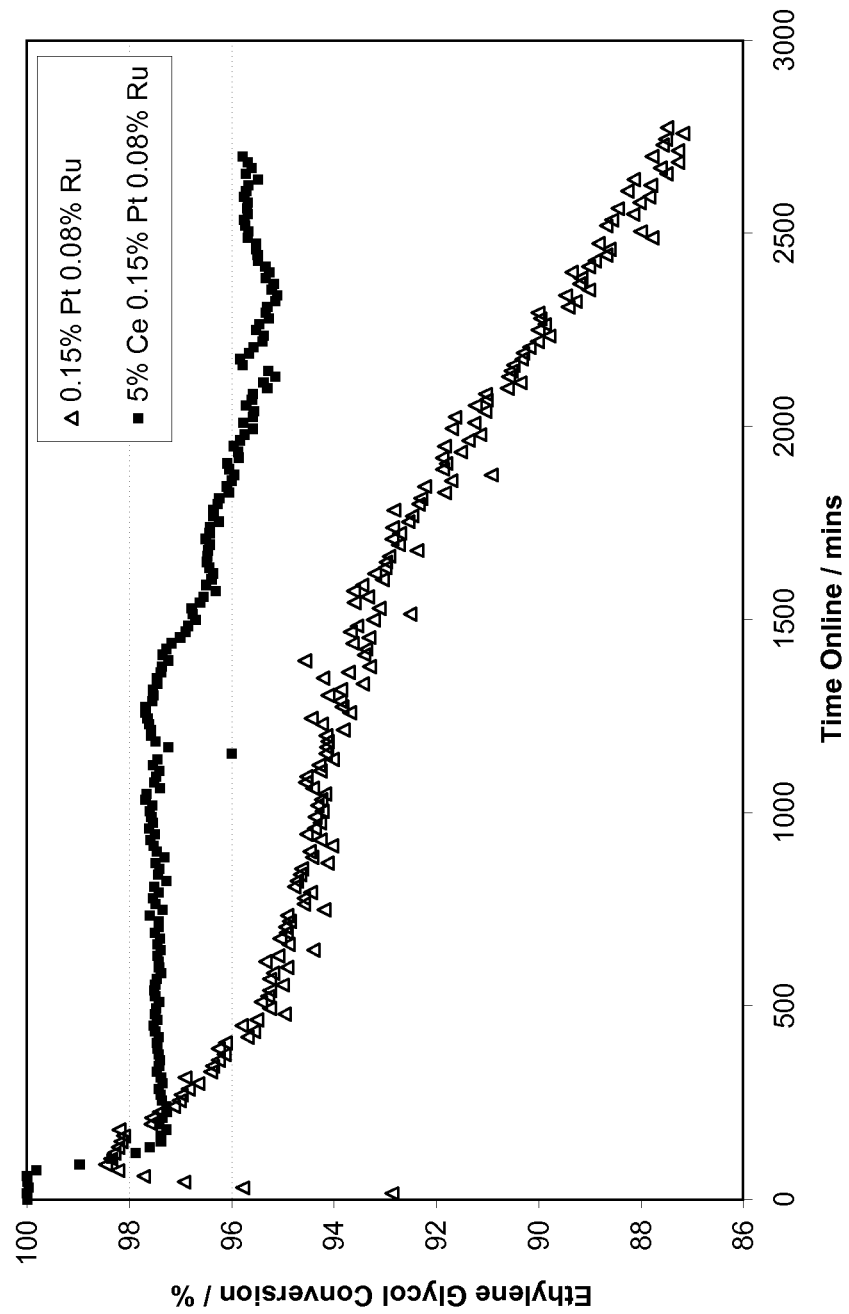

CATALYST AND PROCESS

CROSS-REFERENCE TO RELATED APPLICATIONS

This application is the U.S. National Phase application of PCT International Application No. PCT/GB2009/051208, filed Sep. 17, 2009, and claims priority of British Patent Application No. 0817109.2, filed Sep. 18, 2008, the disclosures of both of which are incorporated herein by reference in their entirety for all purposes.

FIELD OF THE INVENTION

The present invention concerns the removal of volatile organic compounds (VOCs) from gas streams. In particular the invention is useful for the purification of inert gas streams containing organic materials such as hydrocarbons and glycols which are present in the gas stream exiting a solid phase polymerisation (SPP) process, although the process and catalyst are not limited to the use in that application.

BACKGROUND OF THE INVENTION

It is well known in polyester manufacture to increase the molecular weight of a polymer produced in a melt-phase polycondensation process by the treatment of solid particles of polymeric material at elevated temperatures in the presence of a flowing inert gas stream. The gas stream removes the products of the reaction from the particles and may contain glycols, oligomers and acetaldehyde amongst other compounds. The gas stream is typically circulated through the reactor containing the solid particles continuously and passes through a purification reactor in order to remove the organic species contained therein before it enters the SPP reactor. This process is described in EP-A-0660746, EP-A-1315769, and EP-A-0699471. The process is known as solid state polymerisation (SSP), solid state polycondensation (SSP) or solid phase polymerisation (SPP) and these terms should be taken to have the same meaning in this specification.

The oxidation catalyst used in the purification process is typically either platinum (Pt) or palladium (Pd) or a mixture of them, supported on a solid support material such as alumina. EP-A-0660746 describes a process for the purification of inert gas stream containing organic impurities from an SPP reactor comprising adding oxygen or gas containing oxygen to the gas stream and circulating the gas stream through a catalytic bed containing Pt or mixtures of Pt and Pd supported on an inert porous support at temperatures from 250 to 600° C. The process is characterized in that the quantity of oxygen used is stoichiometric with respect to the organic impurities or in such an excess that the gas at the outlet of the oxidation reactor contains up to 10 ppm of oxygen.

SUMMARY OF THE INVENTION

We have found that the process for the oxidation of organic compounds may be improved by the use of a novel catalyst not disclosed in the prior art. The present invention provides an improved process for the oxidation of organic compounds in a gas stream. The invention further provides a novel catalyst which is useful for the oxidation of organic compounds in a gas stream.

According to the invention, a process for the oxidation of organic compounds contained in a gas stream comprises the step of introducing said gas stream containing the organic compounds into a reactor containing an oxidation catalyst together with sufficient oxygen to effect the desired amount of oxidation and maintaining the temperature of said gas stream at a temperature sufficient to effect oxidation, characterised in that the oxidation catalyst contains at least 0.01% by weight of a metal selected from ruthenium, cobalt or manganese or a combination thereof. The preferred metal is ruthenium.

According to a further aspect of the invention, we provide a catalyst comprising a support material, from 0.05-5% by weight of platinum, palladium or a mixture of platinum and palladium; and from 0.01 to 5% by weight, based on the total weight of catalyst metals plus support, of a metal selected from ruthenium, cobalt or manganese or a combination thereof. The preferred metal is ruthenium.

BRIEF DESCRIPTION OF THE FIGURES

FIG. 2 is the percent (%) conversion of ethylene glycol vs. time for the catalysts of Examples 2 and 9.

DETAILED DESCRIPTION OF THE INVENTION

Figure 1:
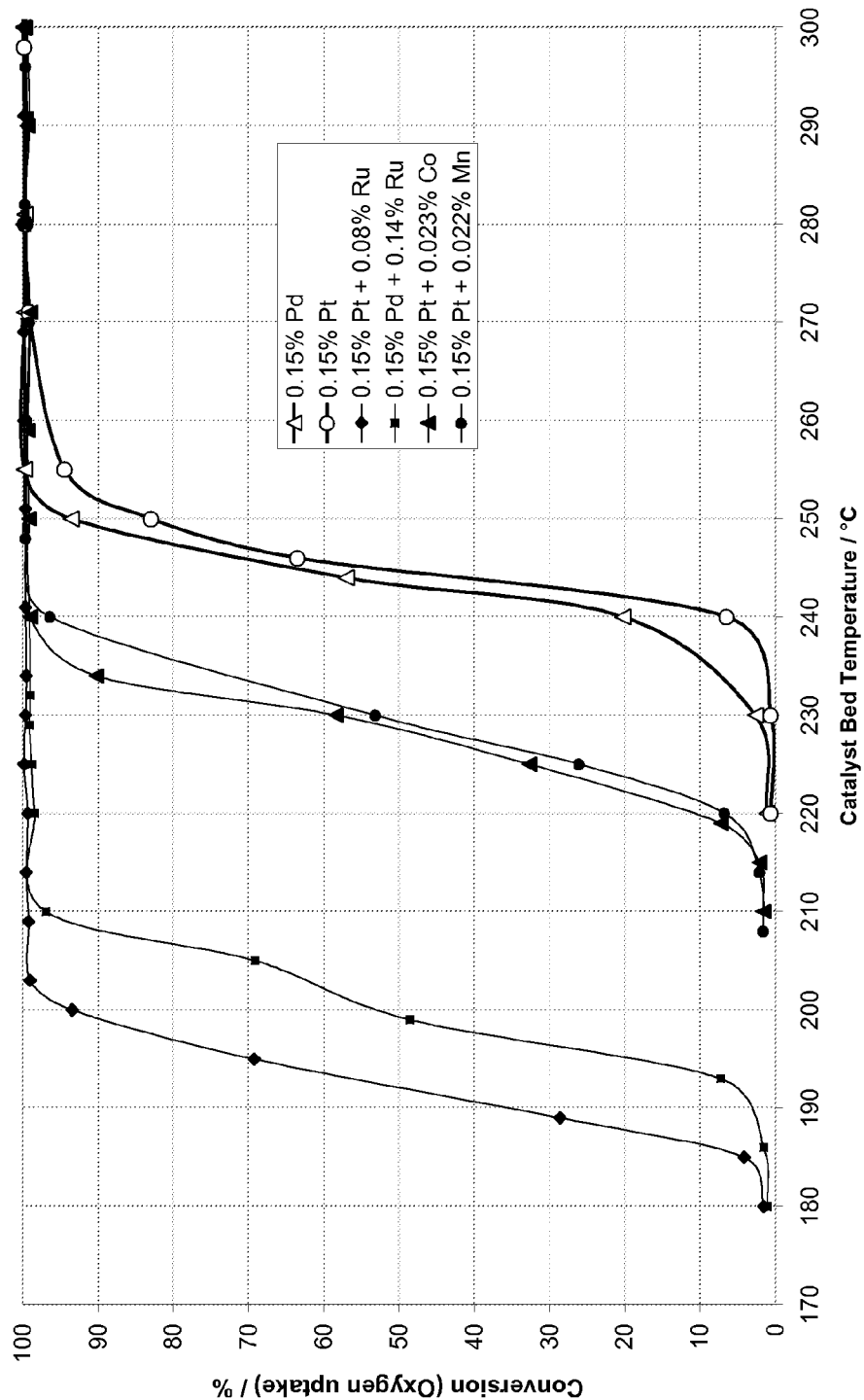
FIG. 1 is the percent (%) conversion of ethylene glycol vs. temperature for the catalysts of Examples 1-4 and Comparative Examples 1 and 2.

We have found that the use of a catalyst containing ruthenium, cobalt or manganese enables the oxidation process to be carried out at a lower temperature than is typical using a conventional platinum and/or palladium catalyst. The reduction in oxidation temperature has clear economic advantages because the process then requires less energy to operate. For example, in a solid phase polymerisation process, which is typically operated at a temperature of between 210 and 215° C., the gas stream exiting the SPP reactor must be heated up to the operating temperature of the oxidation step and then cooled down before it re-enters the SPP process. Furthermore, when the treated gas stream is cooled to enable water formed during the oxidation process to condense out of the gas stream, the amount of cooling required is less if the oxidation process is run at a lower temperature. When the operating temperature of the oxidation is 300° C. as described in the Example of EP-A-660746, then the amount of energy required for heating and cooling the circulating gas stream between 215 and 300° C. may be considerable.

The catalyst preferably comprises ruthenium, cobalt or manganese or a compound of ruthenium, cobalt or manganese supported on a solid catalyst support. The catalyst support material is selected from any known support which is stable under the operating conditions of the oxidation reaction. Preferred support materials include alumina (in all forms, including alpha alumina and transition aluminas such as gamma, theta and delta alumina for example), silica, silica-alumina, ceria, titania, zirconia or mixtures of these. A preferred support contains alumina, particularly transition aluminas. Particularly preferred supports include alumina and mixtures of alumina with ceria, especially alumina mixed with up to about 20% by weight of ceria. Preferably the support material does not comprise carbon in order to avoid the risk of oxidation of the carbon in the reactor. The support may be modified, treated or coated. For example an alumina support may be impregnated with a solution of a metal salt such as cerium nitrate which, upon calcination, modifies the support by forming ceria in or on a part of the alumina. The support is preferably porous, most preferably having a porosity greater than 0.3 ml/g, especially >0.5 ml/g. A high surface area support is preferred, for example a support having a surface area >50 m²/g, especially >80 m²/g is particularly suitable.

The physical form of the catalyst may be particulate or massive. Particulate forms include powders, granules, spherical particles, tablets, lobed shaped particles or other 3-dimensional shapes. Typical particles for use in forming fixed catalyst beds for gaseous reactants have a minimum dimension in the range from 1-10 mm. The skilled person will appreciate that the size and shape of the particles affects the flow of gas through the bed and so the appropriate particle dimension may be selected dependent on the amount of gas to be treated and the acceptable pressure drop through the reactor. Powders or granules of a size less than 1 mm, especially from 50-500 μm may be used if the oxidation reaction is to be carried out in a fluidised bed reactor. Massive forms of catalyst include structured reactors such as catalytic monolith reactors or catalyst materials supported on mesh or foamed supports.

The catalyst contains at least 0.01% by weight of ruthenium, cobalt or manganese. Preferably the catalyst also contains at least one further metal or metal compound which is preferably a noble metal, more preferably platinum, palladium or a mixture of these. Preferably the catalyst comprises a support material, from 0.05 to 5% by weight of platinum, palladium or a mixture of platinum and palladium; and from 0.01 to 5% by weight of ruthenium. More preferably the catalyst comprises from 0.03 to 1% by weight of ruthenium, especially from 0.03 to 0.2% by weight of ruthenium and we have found that a catalyst containing not more than about 0.1% by weight of ruthenium is effective. The content of platinum, palladium or their mixture in the catalyst is preferably from 0.05-2% by weight, more preferably from 0.1 to 1.0% by weight. The catalyst may be promoted with up to 20% by weight of cerium or a compound of cerium, more preferably from 0.1-15% by weight, especially from 2-10% by weight of cerium or a compound of cerium. Without wishing to be bound by theory, it is believed that the cerium acts as an effective oxygen management promoter under oxygen lean conditions. All percentages are given by weight based on the total weight of catalyst metals plus support.

The catalyst metals, i.e. the ruthenium, cobalt and/or manganese and other metals and cerium promoter, if present, may be present as elemental metals or as metal compounds. It is believed that the active form of the metals is the elemental form although other metal compounds may be present. In particular the catalysts are made typically by depositing a compound of the metal in or on a support material followed by a step of reducing the metal compound to the elemental form to produce very fine metal particles on the support. The metal salt may comprise a salt such as a nitrate, chloride, sulphate, carboxylate (e.g. an acetate, citrate, malonate etc) or a complex with an organic compound such as a β-diketone or an ammine complex, including an ionic ammine complex such as an ammine chloride for example. When more than one metal compound or a promoter is used, then they may be deposited on the support sequentially, in any order; or more than one metal compound may be deposited together, for example from a solution of mixed metal compounds.

The metal compound deposited on the support may be transformed to a different compound by an intermediate step such as calcination as is well-known in the art of catalyst manufacture, but such a step may be unnecessary.

The metal compound and/or promoter and/or an intermediate of any of them if present is typically reduced to metallic form by known methods. The reduction step may be performed in the oxidation reactor itself or the catalyst may be reduced ex-situ and transported in reduced form. Typically the reduction is carried out in a stream of a hydrogen-containing gas, which may be pure hydrogen or a mixture of hydrogen and an inert gas, at elevated temperature however alternative reduction methods such as the use of liquid reducing agents, for example hydrazine, formaldehyde, sodium borohydride or an alcohol, may also be used. In a typical process for the production of a catalyst of the invention a catalyst support is impregnated with a solution of the metal salts, e.g. a nitrate, chloride or sulphate of the ruthenium, palladium and/or platinum and then dried before reduction in a hydrogen-containing gas. In use in the oxidation process, the catalyst is likely to include an oxide of the ruthenium and other metals if present.

The process of the invention is preferably a non-selective oxidation in which the objective is to oxidise the organic compounds in the gas stream to carbon dioxide and water. Such a process may be distinguished from a selective oxidation process in which the objective is to oxidise only selected organic compounds in the gas stream or to avoid over-oxidation. The step of purifying the flowing inert gas stream in a solid phase polymerisation (SPP) process typically involves passing the gas stream over an oxidation catalyst, together with sufficient oxygen to oxidise the organic materials to carbon dioxide and water, which are then removed from the gas stream. It is considered important to ensure that the oxygen concentration in the gas entering the SPP reactor is as low as possible because the presence of oxygen at the temperatures under which the SSP reaction proceeds can lead to degradation of the polymer. Therefore the addition of oxygen to the purification process is normally limited to that required for stoichiometric or near-stoichiometric reaction with the organic components of the gas stream. Various methods of conducting the purification step using prior art catalysts are known from the prior art in e.g. EP-A-0660746, EP-A-1315769, EP-A-0699471. EP-A-0222714, EP-A-1100611 etc. The control of the reaction and the amount of oxygen added to the gas stream is discussed in these references. The present oxidation process includes but is not intended to be limited to these processes.

The temperature of the oxidation process varies from 150° C. to 600° C. depending on the gas stream and application. It is surprising that we have found that the temperature of operation of a purification step in a SPP process may be carried out at a temperature below 250° C., since it is clear that prior art processes using palladium or platinum catalysts specify an operating temperature above 250° C. In a further aspect of the invention we therefore provide a process for purifying a gas stream originating from a solid-phase polymerisation reactor, said gas stream comprising an inert gas and a minor amount of one or more organic compounds comprising the step of passing said gas stream together with oxygen over a catalyst, characterised in that the gas stream contacts the catalyst at a temperature of less than 250° C. Preferably the contact temperature is between 150 and 249° C., more preferably from 180 to 240° C. Preferably the process is operated at a GHSV in the range from 2,000-20,000, especially between 5,000 and 15,000. The inert gas is typically nitrogen. The organic compounds in the gas stream typically include acetaldehyde, an alkylene glycol which is typically ethylene glycol and/or polyester oligomers, hydrocarbons and oxygenated hydrocarbons. The catalyst preferably comprises at least 0.01% of ruthenium, a catalyst support and optionally other metals as described above.

Although the catalyst is particularly suitable for the purification of a gas stream from a solid phase polymerisation reactor, its use in other applications is also contemplated. The catalyst is useful for the catalytic oxidation of volatile organic compounds in a number of industrial applications. Examples include but are not limited to cryogenic gas handling and treatment operations, for example in the purification of gas for supply in bottled form; the destruction of solvent vapours emanating from coating and printing operations; refinery processes, oil and gas treatment and drilling, chemical processes including polymerisation processes, water treatment, processing of natural products such as foods, e.g. roasting, amongst others. In many of these applications, there is no strict limit on the amount of oxygen used and so the process may be operated in the presence of an excess of oxygen.

EXAMPLES

The invention will be further described in the accompanying examples and with reference to the accompanying drawing which is a graph showing the conversion of oxygen at a range of catalyst bed temperatures using the catalysts of the invention and some comparison catalysts of the prior art.

Example 1

2.07 g of a solution of palladium nitrate in nitric acid, containing 15.24% by weight of Pd, was diluted in 60 ml of demineralised water to form a first solution. 2.00 g of a solution of ruthenium nitrosylnitrate (Ru(III)(NO)(NO$_3$)$_3$) in nitric acid, containing 14.88% by weight of Ru, was dissolved in 60 ml of demineralised water to form a second solution. The first and second solutions were mixed and made up to 150 ml with demineralised water. 208 g of gamma alumina spheres (3 mm diameter, 115 m$^2$/g surface area, pore volume 80 ml/100 g) were charged to a laboratory tumbling apparatus and tumbled slowly at about 2 rpm. The mixed solution was added slowly to the tumbling alumina pellets in aliquots over about 10 minutes. The tumbling was continued for a further 15 minutes, and then the catalyst was dried overnight in an air oven at 105° C. The dried catalyst was then transferred to a reduction apparatus and heated to 250° C. in flowing hydrogen. The flow was maintained at this temperature for 2 hours at 250° C. after which the apparatus and catalyst was cooled. The dry catalyst contained 0.15% by weight Pd and 0.14% by weight Ru.

Example 2

The method of Example 1 was repeated using as a first solution a solution of 2 g of a solution of platinum nitrate (Pt(NO$_3$)$_4$) in nitric acid containing 15.69% by weight of Pt, made up to 60 ml in demineralised water. The second solution contained 1.1 g of the ruthenium nitrosylnitrate solution made up to 60 ml in demineralised water. The resulting dry catalyst contained 0.15% by weight Pt and 0.08% by weight Ru.

Example 3

2.00 g of the platinum nitrate solution used in Example 2 was diluted in 60 ml of demineralised water to form a first solution. A second solution was prepared containing 1% of manganese by weight by dissolving manganese nitrate Mn(NO$_3$)$_2$·4H$_2$O in demineralised water. 4.41 g of the second solution was mixed with the first solution and made up to 150 ml with demineralised water. 208 g of 3 mm alumina spheres as used above were charged to a laboratory tumbling apparatus and tumbled slowly at about 2 rpm. The mixed solution was added slowly to the tumbling alumina pellets in aliquots over about 10 minutes. The tumbling was continued for a further 15 minutes, and then the catalyst was dried overnight in an air oven at 105° C. The dried catalyst was then transferred to a reduction apparatus and heated to 250° C. in flowing hydrogen. The flow was maintained at temperature for 2 hours at 250° C. after which the apparatus and catalyst was cooled. The dried catalyst contained 0.15% by weight Pt and 0.022% by weight Mn.

Example 4

Example 3 was repeated with the exception that the second solution was made using cobalt nitrate (Co(NO$_3$)$_2$·6H$_2$O) instead of manganese nitrate and contained 1% of Co by weight. The dried catalyst contained 0.15% by weight Pt and 0.023% by weight Co.

Example 5

Example 4 was repeated using as a first solution a solution of palladium nitrate (Pd(NO$_3$)$_4$) made as described in Example 1. The resulting catalyst contained 0.15% by weight Pd and 0.023% by weight Co.

Comparative Example 6

The method of Example 1 was repeated using a single solution of 2 g of platinum nitrate (Pt(NO$_3$)$_4$) made up to 60 ml in demineralised water. The resulting catalyst contained 0.15% by weight Pt.

Comparative Example 7

The method of Example 1 was repeated using a single solution of palladium nitrate (Pd(NO$_3$)$_2$) made up to 60 ml in demineralised water. The resulting catalyst contained 0.15% by weight Pd.

Example 8

The performance of the catalysts in the oxidation of organic compounds was tested as described below.

The catalysts were tested as whole spheres in a 1" (2.54 mm) diameter tubular stainless steel reactor equipped with a thermocouple for measuring catalyst bed temperature. The bulk volume of catalyst charged for each test run was 15 ml and the catalyst charge was located between two beds of inert alumina particles with each layer being separated by a small plug of glass wool. The reactor was connected to a test rig and pressure tested to approximately 2.5 bar-g. A flow of gas of composition 0.1% O$_2$ in nitrogen was established to the reactor via independent mass flow controllers at a GHSV of 15000 h$^{-1}$ (flow rate ~3.8 litres/min). The gas pre-heater and reactor were heated to 300-320° C. over approx. 1 hour. A liquid flow of ethylene glycol was then established to the pre-heater where it was vaporised and mixed with the 0.1% O$_2$ in nitrogen feed prior to being fed to the reactor. The process gas composition as it entered the reactor was 1000 ppm oxygen, 400 ppm ethylene glycol with the balance being nitrogen. The oxygen content of the gas stream was measured using an Orbisphere™ on-line oxygen analyser. Gas compositions are given by volume. Once the process conditions had been established at 300° C., the system was allowed to equilibrate for approximately 1 hour.

The level of oxygen, in the gas exiting the reactor was then measured as a function of temperature to assess the performance of the catalyst. Conversion was calculated according to the equation:

$$\% \text{ Conversion} = 100 - \left(\frac{O_2 \text{ exit}}{O_2 \text{ inlet}} \times 100\right)$$

The temperature of both the catalyst bed and the gas pre-heater was reduced in parallel from 300-320° C. to 200-230° C. in 5-20° C. intervals (i.e. the reactor and the pre-heater were maintained at the same temperature), except that the gas pre-heater temperature was not reduced below 210° C. in order to ensure vaporisation of the ethylene glycol (bp=198° C.). The system was allowed to equilibrate at each temperature for 0.5-1 hour before the oxygen measurement was taken. Percent (%) conversion versus temperature is shown plotted for each catalyst tested in FIG. 1.

The results show that the conversion is significantly greater at lower temperatures using the catalysts of the invention containing ruthenium, manganese or cobalt than using the comparative catalysts containing only platinum or palladium.

Example 9

70.0 g of a solution of cerium nitrate in water, containing 15.0% by weight of Ce, was diluted to 143 ml with demineralised water. 198 g of alumina spheres were charged to a laboratory tumbling apparatus and tumbled slowly at about 2 rpm. The cerium nitrate solution was added slowly to the tumbling alumina pellets in aliquots over about 10 minutes. The tumbling was continued for a further 15 minutes, and then the impregnated support was dried overnight in air at 105° C.

1.91 g of a solution of platinum nitrate in nitric acid, containing 15.69% by weight of Pt, was diluted in 52 ml of demineralised water to form a first solution. 1.10 g of a solution of ruthenium nitrosylnitrate (Ru(III)(NO)(NO$_3$)$_3$) in nitric acid, containing 14.24% by weight of Ru, was dissolved in 52 ml of demineralised water to form a second solution. The first and second solutions were mixed and made up to 131 ml with demineralised water. 198 g of the dried cerium nitrate impregnated support were charged to a laboratory tumbling apparatus and tumbled slowly at about 2 rpm. The mixed solution was added slowly to the tumbling pellets in aliquots over about 10 minutes. The tumbling was continued for a further 15 minutes, and then the catalyst was dried overnight in air at 105° C. The dried catalyst was then transferred to a reduction apparatus and heated to 250° C. in flowing hydrogen. The flow was maintained for 2 hours at 250° C. after which the apparatus and catalyst was cooled. The dry catalyst contained 0.15% Pt, 0.08% Ru and 5% Ce.

Example 10

2.0 g of a solution of platinum nitrate in nitric acid, containing 15.69% by weight of Pt, was diluted to 20 ml with demineralised water to form a first solution. 1.10 g of a solution of ruthenium nitrosyl nitrate (Ru(III)(NO)(NO$_3$)$_3$) in nitric acid, containing 14.88% by weight of Ru, was diluted to 20 ml with demineralised water to form a second solution. The first and second solutions were mixed and added to 70.0 g of a solution of cerium nitrate in water, containing 15.0% by weight of Ce. The mixed solution containing the three metal salts was then diluted to a final volume of 143 ml with demineralised water to form the co-impregnation solution. 198 g of alumina support were charged to a laboratory tumbling apparatus and tumbled slowly at about 2 rpm. The mixed impregnation solution was added slowly to the tumbling pellets in aliquots over about 10 minutes. The tumbling was continued for a further 15 minutes, and then the catalyst was dried overnight in an air oven at 105° C. The dried Ce-promoted catalyst was then transferred to a reduction apparatus and heated to 250° C. in flowing hydrogen over 1.5 hours. The flow was maintained for 2 hours at 250° C. after which the apparatus and catalyst was cooled. The dry catalyst contained 0.15% Pt, 0.08% Ru and 5% Ce.

Example 11

40 mg of crushed catalyst made in Example 9 was tested for use in the oxidation of ethylene glycol at 190° C. The gas feed stream composition was 400 ppm ethylene glycol and 700 ppm oxygen in nitrogen. In this system, 1000 ppm oxygen is required for complete stoichiometric reaction to carbon dioxide and water and so the conditions were sub-stoichiometric on oxygen. The results are plotted in FIG. 2 together with results obtained from a catalyst containing 0.15% Pt, 0.08% Ru and no Ce. The results show that the cerium-promoted catalyst retains significantly higher conversion than the un-promoted catalyst over the duration of the test.

Example 12: Alternative Catalyst Preparation 2.24 g of a solution of sodium hexahydroxyplatinate, containing 7.05% by weight of Pt, and 3.59 g of a solution of sodium ruthenate, containing 2.34% by weight of Ru, were mixed and diluted with demineralised water. 99.8 g of alumina spheres were charged to a laboratory tumbling apparatus and tumbled slowly at about 2 rpm. The mixed metal solution was added to the alumina support over a period of 2 minutes and then tumbled for a further 15 minutes. The catalyst was then dried in an air oven overnight at 105° C. The dried catalyst was transferred to a reduction apparatus and heated to 320° C. in a flow of 5% hydrogen in nitrogen. The flow was maintained at this temperature for 2 hours, after which the apparatus and catalyst were allowed to cool. The dry catalyst contained 0.15% Pt and 0.08% Ru.

Example 13: Alternative Catalyst Preparation 1.03 g of a solution of platinum nitrate, containing 15.95% by weight of Pt, and 0.60 g of a solution of ruthenium nitrosylnitrate, containing 14.78% by weight of Ru, were mixed and diluted to 2.5 times the support pore volume with demineralised water. 99.8 g of alumina spheres were charged to a laboratory tumbling apparatus and tumbled slowly at about 2 rpm. The mixed metal solution was quickly poured onto the alumina support in a single portion. The mixture was tumbled for 1 minute and then allowed to soak without tumbling for a further 15 minutes. The tumbling and resting process was repeated twice before the excess solution was drained and the catalyst dried overnight in an air oven at 105° C. The dried catalyst was transferred to a reduction apparatus and heated to 320° C. in a flow of 5% hydrogen in nitrogen. The flow was maintained at this temperature for 2 hours, after which the apparatus and catalyst were allowed to cool. The dry catalyst contained 0.15% Pt and 0.08% Ru.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A process for the oxidation of organic compounds contained in a gas stream comprising the step of introducing said gas stream containing the organic compounds together with sufficient oxygen to effect the desired amount of oxidation into an oxidation reactor containing an oxidation catalyst and maintaining the temperature of said gas stream at a temperature sufficient to effect oxidation, wherein the oxidation catalyst comprises a support material, from 0.05-5% by weight of at least one metal selected from the group consisting of platinum and palladium, and from 0.01-0.2% by weight of ruthenium, all percentages are based on the total weight of catalyst metals plus support.

2. A process according to claim 1, wherein the catalyst further comprises from 0.1-20% by weight of cerium or a compound of cerium.

3. A process according to claim 1, wherein the temperature of the gas stream is in the range from 150 to 600° C.

4. A process according to claim 3, wherein the temperature is in the range from 150 to 249° C.

5. A process according to claim 1, wherein a major portion of the gas stream comprises an inert gas.

6. A process according to claim 1, wherein at least a portion of the gas stream has passed through a reactor containing solid particles of a polymeric material before it is introduced into the oxidation reactor.

7. A process according to claim 1, wherein the oxidation catalyst comprises from 0.03-0.2% by weight of ruthenium.

8. A process according to claim 7, wherein the oxidation catalyst contains from 0.1-1.0% by weight of platinum or palladium.

9. The process according to claim 1, wherein the amount of oxygen added to the oxidation process is less than or equal to that required for stoichiometric reaction with the organic compounds in the gas stream.

10. A catalyst comprising a support material, from 0.05-5% by weight of at least one metal selected from the group consisting of platinum and palladium, and from 0.01-0.2% by weight of ruthenium, all percentages are based on the total weight of catalyst metals plus support.

11. A catalyst according to claim 10, wherein said support comprises alumina, silica, silica-alumina, ceria, titania, zirconia or a mixtures of these compounds.

12. A catalyst according to claim 10, containing from 0.03-0.2% by weight of ruthenium.

13. A catalyst according to claim 10 further comprising from 0.1-20% by weight of cerium or a compound of cerium.

14. A catalyst according to claim 11, containing from 0.05-2% by weight of platinum or palladium.

15. A catalyst according to claim 14, containing from 0.05-1% by weight of platinum or palladium.

* * * * *